Figure 1:
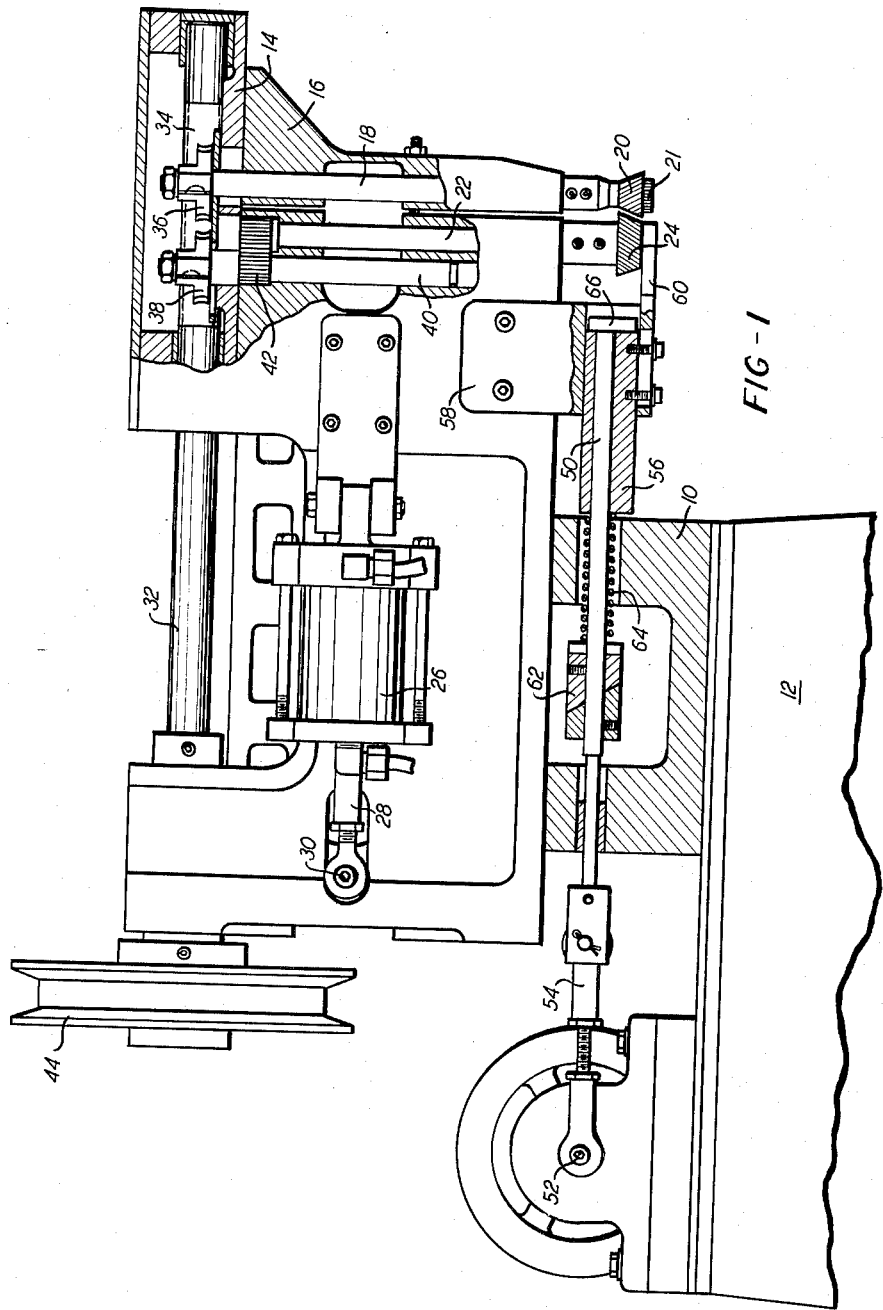

Sept. 21, 1965  J. S. KAMBORIAN ETAL  3,206,781
METHOD AND APPARATUS FOR ADHESIVELY BONDING
AN UPPER TO A WELT RIB
Filed May 11, 1962                                                    5 Sheets-Sheet 1

INVENTORS
Jacob S. Kamborian
BY Albert Kamborian
Albert Gordon
ATT'Y

Sept. 21, 1965 J. S. KAMBORIAN ETAL 3,206,781
METHOD AND APPARATUS FOR ADHESIVELY BONDING
AN UPPER TO A WELT RIB
Filed May 11, 1962 5 Sheets-Sheet 2

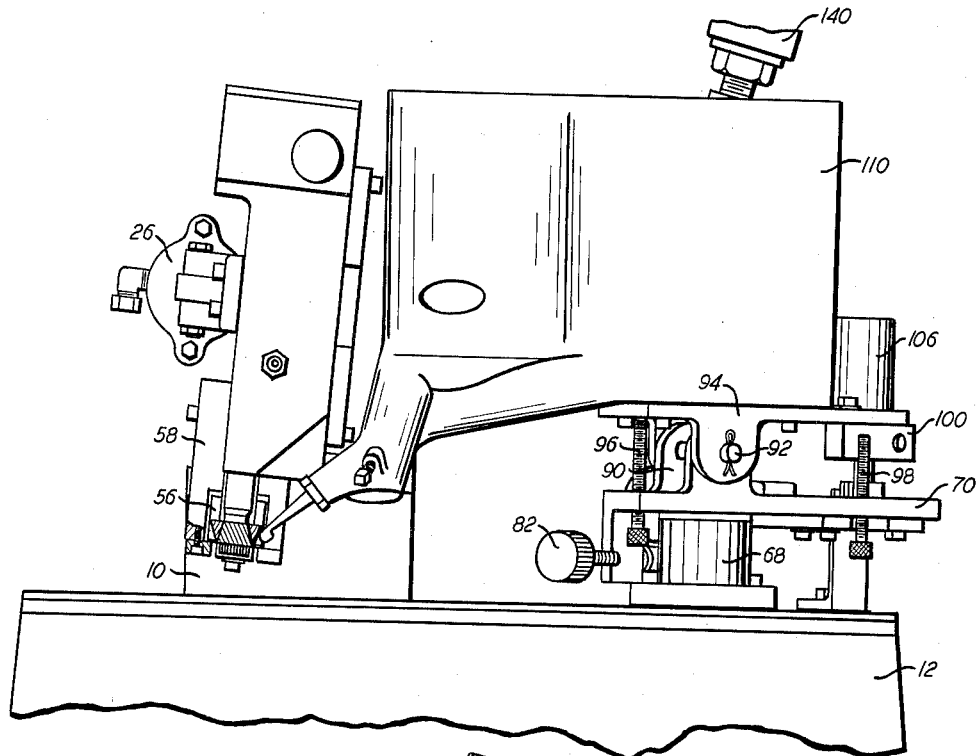
FIG.-3
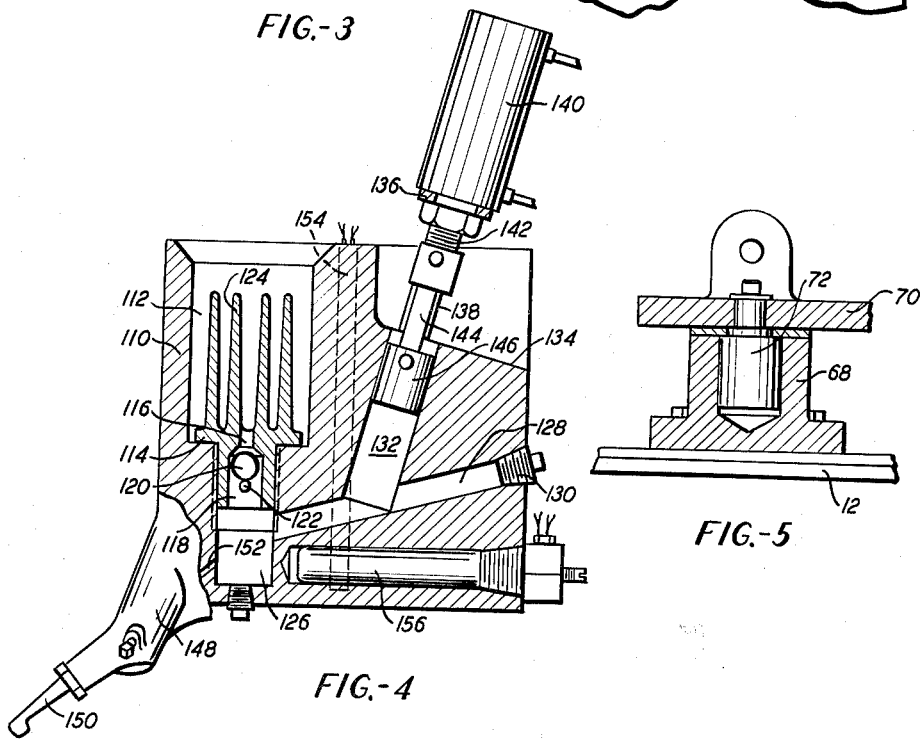
FIG.-4
FIG.-5

Sept. 21, 1965    J. S. KAMBORIAN ETAL    3,206,781
METHOD AND APPARATUS FOR ADHESIVELY BONDING
AN UPPER TO A WELT RIB
Filed May 11, 1962    5 Sheets-Sheet 4

United States Patent Office 3,206,781
Patented Sept. 21, 1965

3,206,781
METHOD AND APPARATUS FOR ADHESIVELY BONDING AN UPPER TO A WELT RIB
Jacob Simon Kamborian, 133 Forest Ave., West Newton, Mass., and Albert Kamborian, Newton Center, Mass.; said Albert Kamborian, assignor to said Jacob Simon Kamborian
Filed May 11, 1962, Ser. No. 194,077
11 Claims. (Cl. 12—145)

In the manufacture of Goodyear welt shoes, an insole is used having a welt rib thereon. It is currently the practice to secure the margin of the upper to the welt rib by means of staples after which the welt is stitched to the upper and welt rib. In subsequent operations, a filler is placed against the insole interiorly of the welt rib and the outside is stitched to the welt.

It has been proposed in Patent No. 2,659,912, granted November 24, 1953, to bond the upper to the welt rib and to the feather of the insole by means of cement instead of using staples while the upper and insole are mounted on a last, and to pull the upper tightly about the last prior to the cementing of the insole and upper. This arrangement has the advantage of providing a continuous connection between the upper and insole rather than the discontinuous connection provided by staples, and the sewing needles used in the subsequently performed sewing operations would not be in danger of breaking by engaging the staples. In addition, cementing the upper and insole while the upper is under tension provides for an upper stretched tightly about the last. In the aforesaid patent, the insole rib and the feather were coated with adhesive prior to assemblage on the last and pressure was exerted to force the upper margin against the rib and feather to thereby bond the upper to the insole. Because of the upper being under tension while being bonded and the relatively small areas of the surfaces to be bonded, this arrangement for bonding did not prove to be entirely satisfactory. The instant invention overcomes the disadvantages of the process disclosed in the aforementioned patent while maintaining its advantages by applying a hot melt cement in liquid form into the angle between the father and rib just prior to gripping, advancing and stretching heightwise that portion of the upper margin that is at a higher level than the rib, and applying a pressing force to press the up-pulled upper to the rib just below the region where the gripping takes place and the upper is under the greatest tension. The hot-melt cement used has the characteristic of setting very soon after being applied so that the pressing force serves to bondy the adhesive to the insole practically instantaneously. One cement having the fast setting characteristic is Versalon 501, manufactured by General Mills, Incorporated.

An apparatus has been provided for carrying into effect the aforesaid objectives. The apparatus includes oppositely tapering, frustro-conical, feed rolls for gripping the portion of the upper margin located above the welt rib and concomitantly feeding the upper margin forwardly and pulling it heightwise about the last. A holddown button is provided on one of the feed rolls to restrain upward movement of the insole and to engage the interior surface of the upper margin. A cement extruding nozzle is located rearwardly of the feed rolls at a lower elevation than the feed rolls to apply cement in the angle between the insole feather and the welt rib. Means are provided to yieldably urge the nozzle into the corner formed by this angle and to extend cement through the nozzle. A wiper is located below the feed rolls that is in engagement with the exterior surface of the upper margin to press the up-pulled margin against the feather and welt rib. The wiper is resiliently urged against the margin so it may yield when presented against a thickened margin portion.

Figure 2:
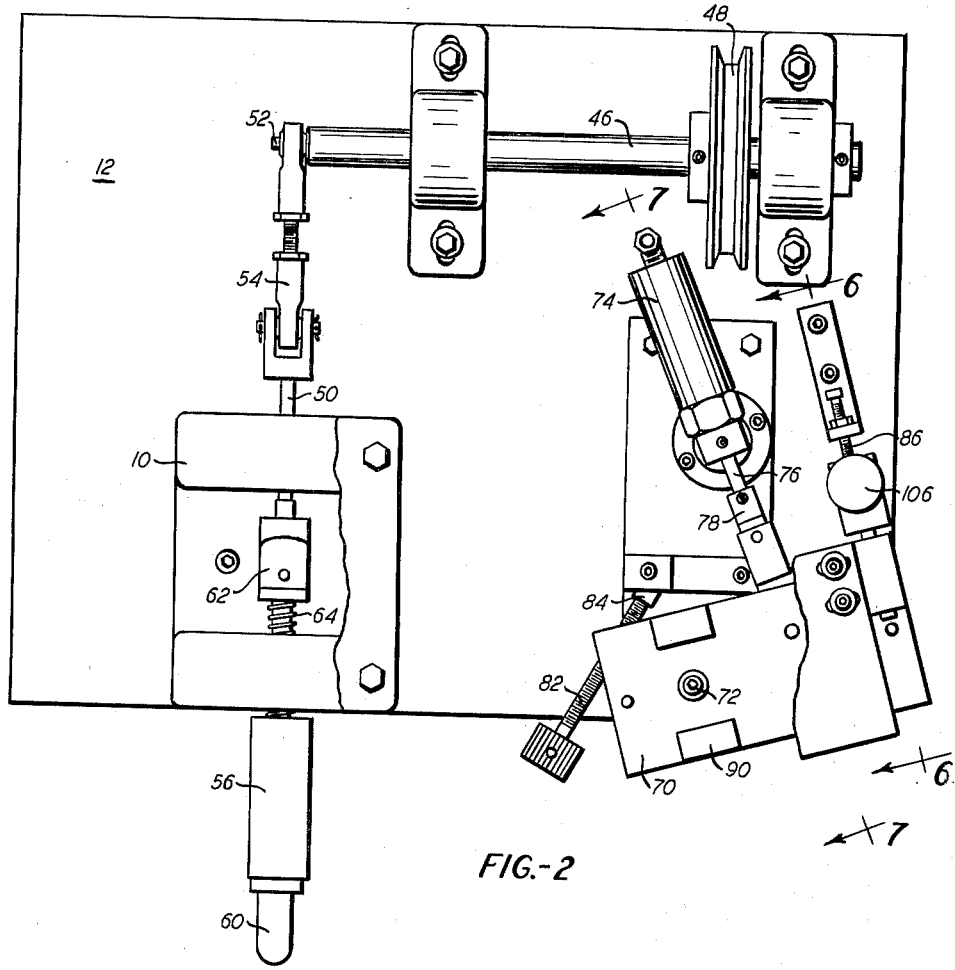
Figure 6:
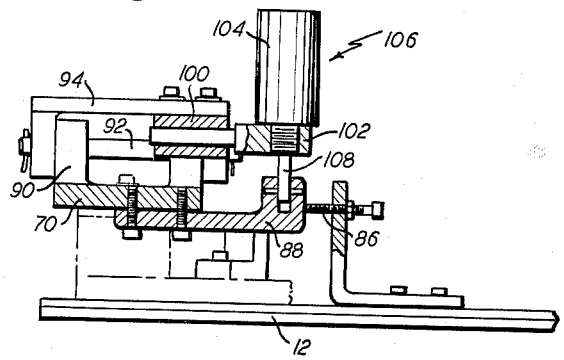
Figure 7:
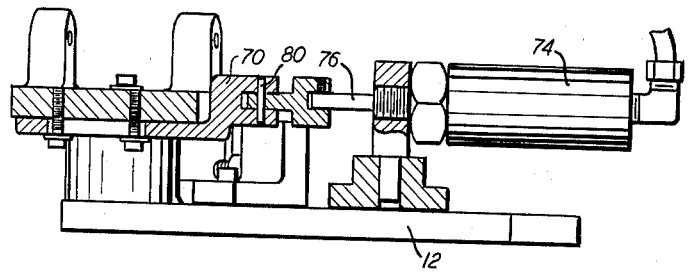
Figure 8:
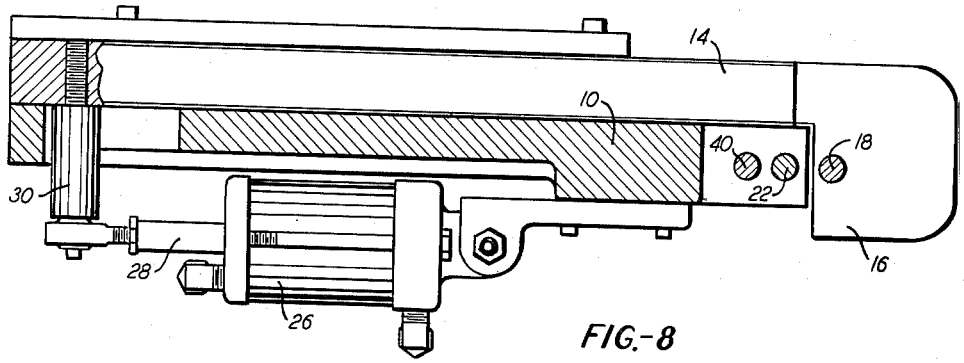
Figure 9:
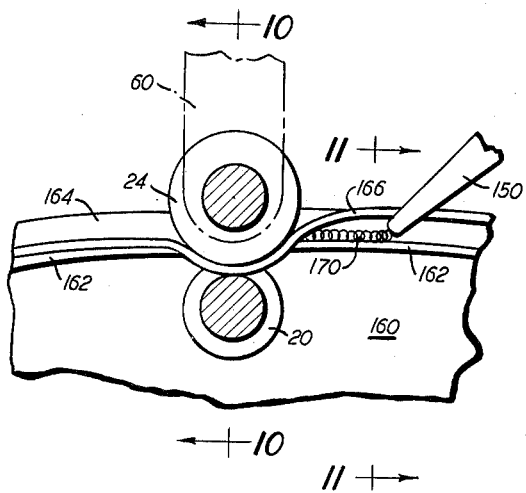
Figure 10:
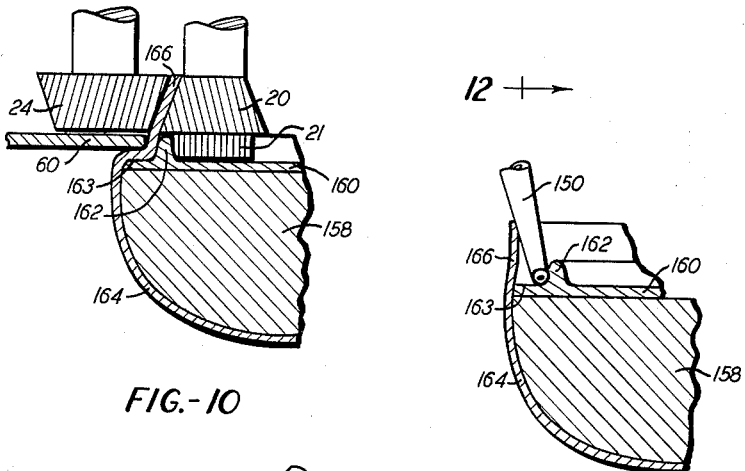
Figure 11:
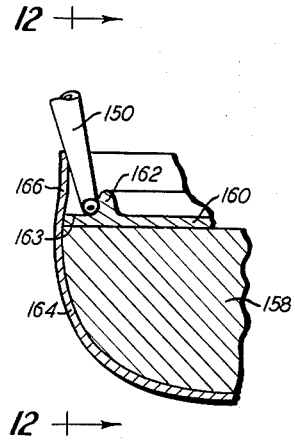
Figure 12:
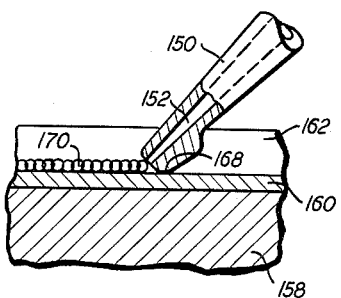

In the accompanying drawings:
FIGURE 1 is a side elevation of the machine, partially in section;
FIGURE 2 is a plan view of the machine with the feed rolls, nozzle and cement extruding means omitted;
FIGURE 3 is a front elevation of the machine showing the feed rolls, nozzle and cement extruding means;
FIGURE 4 is a sectional view of the cement extruding means;
FIGURE 5 is a detail of the mounting of the cement extruding means;
FIGURE 6 is a section taken on the line 6—6 of FIGURE 2;
FIGURE 7 is a section taken on the line 7—7 of FIGURE 2;
FIGURE 8 is a section of the machine showing a mechanism for moving the feed rolls toward or away from each other;
FIGURE 9 is a schematic representation in plan of the shoe passing past the cement nozzle, feed rolls and wiper;
FIGURE 10 is a view taken on the line 10—10 of FIGURE 9;
FIGURE 11 is a view taken on the line 11—11 of FIGURE 9; and
FIGURE 12 is a view taken on the line 12—12 of FIGURE 11.

The machine comprises a head 10 mounted on a base 12. A slide 14 is slidably mounted in the top of the head for inward and outward movement (FIGURES 1 and 8). An extension 16 of the slide has a downwardly extending shaft 18 rotatably mounted therein, and an upwardly and inwardly tapering, frustro-conical, front feed roll 20 is secured to the lower end of the shaft 18. A button 21 extends downwardly of the roll 20. A second shaft 22 is rotatably mounted in the head 10 inwardly of and parallel to the shaft 18. A downwardly and inwardly tapering, frustro-conical, back feed roll 24 is secured to the lower end of the shaft 22. An air actuated motor 26, mounted on the head 10, has a piston rod 28 extending inwardly which is connected by a pin 30 to the slide 14. A drive shaft 32, rotatably mounted in the head 10, has a worm 34 mounted thereon. A worm gear 36, in mesh with the worm, is pinned to the shaft 18. A second worm gear 38 is pinned to a shaft 40, and the shaft 40 is connected through gearing 42 to the shaft 22. A pulley 44 on the inner end of the drive shaft 32 is connected to a source of power.

Rotation of the drive shaft 32, through the gearing described above, causes rotation of the feed rolls 20 and 24 in opposite directions. The admission of air to the motor 26 to retract the piston rod 28 causes the slide 14 and the feed roll 20 to move outwardly, thus separating the feed rolls 20 and 24, and the projection of the piston rod away from the motor causes the feed rolls to be brought together. The driving relationship between the feed roll 20 and the worm 34 is not disturbed during the inward and outward movement of the feed roll as the worm gear 36 then rolls along the worm and remains in mesh therewith.

Referring to FIGURES 1 and 2, a second drive shaft 46, rotatably mounted in the head 10, has a pulley 48 secured thereto that is connected to the source of power. A bar 50, slidably mounted in the head 10 for inward and outward movement, is connected to the drive shaft 46 by way of an eccentric crank 52 on an end of the drive shaft, and a pitman 54 pivoted at its opposite ends to the crank and the bar so that rotation of the drive shaft causes reciprocation of the bar. A wiper holder 56 is slidably mounted on the outer end of the bar 50 and is slidably and non-rotatably mounted in a guide 58 secured to the head 10. A wiper 60 is adjustably connected to the wiper holder 56 to extend below the feed rolls 20 and 24. A collar 62 is pinned to the bar 50, and a compression spring 64 is coiled about the bar 50 between the collar 62 and the wiper holder 56 to yieldably urge the wiper holder outwardly on the bar. An enlargement 66 on the outer end of the bar 50 limits the extent of outward movement of the wiper holder under the influence of the spring.

A bearing 68 is secured to the base 12 rearwardly of the feed rolls 20, 24. A bracket 70 is supported on the bearing and is mounted for swinging movement about the vertical axis of the bearing by means of a pin 72 extending downwardly of the bracket and rotatable in the bearing (FIGURE 5). An air actuated motor 74, mounted on the base 12, has a piston rod 76 that is pivotally connected by way of a strut 78 and a pivot pin 80 to the bracket 70 (FIGURES 2 and 7), whereby actuation of the motor causes the bracket to swing about the vertical axis of the pin 72. A screw 82 mounted in the bracket 70 is adapted to engage a button 84 secured to the base 12 to limit the extent of clockwise movement (FIGURE 2) of the bracket 70 about the axis of the pin 72. A screw 86, mounted on the base 12, (FIGURES 2 and 6), is adapted to engage a bracket extension 88 secured to the bracket 70 to limit the extent of counterclockwise movement (FIGURE 2) of the bracket 70 about the axis of the pin 72.

The bracket 70 has a pair of trunnions 90 extending upwardly thereof that receive a horizontally extending pivot pin 92, see FIGURES 3 and 6. A cement pot support 94 is pivoted on the pin 92 for swinging movement about the axis of the pin. Screws 96 and 98 mounted in the bracket 70 are adapted to bear against the support 94 to respectively limit the extent of counterclockwise and clockwise movement (FIGURE 3), of the support about the axis of the pin 92. The support 94 has a hanger 100 dependent therefrom to which a lug 102 is pinned (FIGURE 6). The cylinder 104 of an air operated motor 106 is secured to the lug 102, and the piston rod 108 of the motor is pinned to the bracket extension 88. Thus, actuation of the motor 106 will cause the support 94 to swing one way or the other about the pin 92.

A cement pot 110 is secured to the support 94. The cement pot may be made substantially like the cement pot disclosed in pending application Serial No. 181,682, filed March 22, 1962, now Patent No. 3,157,896. Referring to FIGURE 4, the pot is made of heat conductive material such as aluminum and includes a well 112 in which a column of cement, preferably in the form of small granules, may be placed. A cement support 114 is threaded into a hole in the bottom of the well 112. The support 114 has a centrally located small diameter passage 116 that opens into a larger diameter passage 118. A ball 120, resting on a pin 122, is cooperative with the passage 116 to act as a valve in the manner described below. The support 114 has a plurality of nodes 124 extending upwardly therefrom. The passage 118 opens into a chamber 126 and an orifice 128, closed by a plug 130, intersects the chamber 126. An inclined bore 132 extends downwardly from a ledge 134 below the top of the pot and intersects the orifice 128. A plate 136 is supported on spacer sleeves 138 above the ledge 134, and an air actuated motor 140 is secured to the plate 136. The motor 140 has a piston rod 142 extending downwardly therefrom coaxially with the bore 132. The piston rod 142 is secured to a shank 144 which in turn is secured to a plunger 146 that is slidable in the bore 132. The pot 110 has a downwardly and forwardly directed projection 148 to which a nozzle 150 is secured, and an orifice 152 extends from the chamber 126 through the nozzle 150 to provide communication between the chamber and the lower end of the nozzle. The conduit 152 has a smaller cross-sectional area than the passages 116 and 118. Electric heating cartridges 154 are located in vertical holes in the pot 110. The heaters are controlled by a thermostat 156 located in a hole in the pot 110 below the orifice 128.

In the operation of the cement pot, the plunger 146 is normally in its upper position and the ball 120 is normally resting on the pin 122 with a space between the ball and the walls of the passage 118 and between the ball and the bottom of the passage 116, as shown in FIGURE 4. The heaters 154 are turned on and thermoplastic cement in granular form is poured into the well 112. The thermostat 156 is set to control the heaters 154 to melt the cement and maintain it molten. The nodes 124 heat the granules of solid cement located in the well 112 and thereby cause a relatively rapid melting of the cement in the well. The molten cement gravitates from the well through the passages 116 and 118 into the chamber 126 and from the chamber 126 into the orifice 128 and the portion of the bore 132 below the plunger 146 to eventually fill these members. Because of the relatively high viscosity of the molten cement and the relatively small cross-sectional area of the conduit 152, the cement does not flow through the conduit in the absence of a super-atmospheric pressure.

When it is desired to extrude molten cement through the nozzle 150 onto work, the motor 140 is actuated to move the plunger 146 downwardly. The downward movement of the plunger 146 creates a pressure to force the ball 120 up against the passage 116 to block the passage and, at the same time, force molten cement from the chamber 126 through the conduit 152 and onto the work. The closing of the passage 116 prevents backflow of cement upwardly therethrough.

The actuation of the motor 140 to move the plunger 134 upwardly prior to its reaching the lower end of the bore 132 creates a suction in the conduit 152 to cause a reverse flow of the cement in the conduit and terminate the extrusion of cement from the nozzle. Since, as aforesaid, the cement used has a relatively high viscosity and tends not to flow downwardly through the conduit in the absence of a super-atmospheric pressure, there is substantially no drip of cement from the nozzle until the plunger 146 is again moved downwardly. The suction forces created by the upward movement of the plunger 146 also causes the ball 120 to move downwardly against the pin 122 to thereby open the passages 116 and 118 and cause cement to be drawn from the well 112 into the chamber 126. The area of the passage around the ball 120 is sufficiently larger than the cross-sectional area of the conduit 152 to permit flow of cement through the passages 116 and 118 despite the relatively high viscosity of the cement while at the same time drawing a negligible amount of cement upwardly through the conduit 152.

In the idle condition of the machine, the feed rolls 20, 24 are stationary and separated from each other, the wiper 60 is stationary, the nozzle 150 is in a raised out-of-the-way position and the plunger 146 is in its upper position. Referring to FIGURES 9–12, a last 158 is provided having an insole 160 tacked to its bottom in the conventional manner. The insole has the conventional welt rib 162 formed thereon and extending away from the bottom of the last. The welt rib is spaced from the edge of the insole by the feather 163. An upper 164 is mounted on the last in the conventional manner and is held on the last by means of the customary tacks driven through the upper into the insole at the forepart and heel portions of the upper. In this condition, the upper includes a margin 166 extending away from the last.

The last-mounted shoe is held bottom-up by the operator and the beginning of the course of the upper margin to be bonded to the insole is presented between the feed rolls 20, 24 with the bottom of the insole bearing against the button 21, the interior surface of the rib 162 bearing against the button 21 and the bottom of the rib bearing against the underside of the feed roll 20.

The motor 26 is now actuated to force the front feed roll inwardly to cause the zone of the upper margin located above the rib 162 to be gripped between the rolls 20 and 24. This is followed by an actuation of the motors 74 and 106 to move the nozzle 150 downwardly and outwardly between the welt rib 162 and the upper margin 166 to cause the nozzle to resiliently bear against the angle between the rib 162 and the feather 163 with a component of force directed downwardly against the insole and a component of force directed against the rib, and an actuation of the motor 140 to cause extrusion of cement out of the nozzle 150 into the angle between the welt rib 162 and the feather 163. At about the same time as the actuation of the motors 74, 106 and 140, the feed rolls 20, 24 are caused to rotate and the wiper 60 is caused to reciprocate.

The nozzle 150 has a bottom part 168 bearing against the insole bottom. The end of the nozzle orifice 152 is located above the nozzle bottom (see FIGURE 12), so that the nozzle bottom may act as a hold-down to restrain upward movement of the insole away from the bottom of the last. As indicated in FIGURE 10, the button 21 acts as a hold-down to restrain upward movement of the insole and last and also acts as a side gage for the rib 162, while the bottom of the roll 20 acts as a top gage for the rib 162. The cement is deposited in the form of a ribbon 170 immediately to the rear of the feed rolls and below the zone of engagement of the upper by the feed rolls. The rotating rolls 20, 24 act to concomitantly grip the upper margin 166, feed it forwardly, exert an upward pull on the margin to stretch it about the last and fold the margin inwardly so that the margin portion below the bite of the feed rolls is folded over the bottom of the last and against the rib 162, the exterior surface of the rib being substantially tangent to the periphery of the roll 20, see FIGURES 9 and 10. The rapidly reciprocating wiper 60, moving beneath the roll 24, engages the upper margin in the area where the maximum upward stress is exerted on the upper margin by the rolls 20, 24 to press the upper margin against the rib 162 and feather 163 and thereby adhesively bond the upper margin to the rib and feather. The button 21 acts as an anvil to cooperate with the wiper in effecting the pressing of the upper against the rib. As aforesaid, the cement used is quick setting so that by the time the upper is released from the wiper 60 and the rolls 20, 24, a permanent bond has been established between the upper margin and the rib and feather with the upper folded over the bottom of the insole and bearing against the rib and feather as shown in FIGURE 10. The resilient force applied by the nozzle 150 in a downward direction by the motor 106 keeps the feather 163 flat against the bottom of the last, while the resilient forces applied by both the motors 74 and 106 ensures that the cement 170 is applied in the corner between the rib and feather so that the upper margin will force the cement over a wide area when it is forced against the rib and feather by the wiper 60 as indicated in FIGURE 10.

This operation is performed continuously from one end to the other of the course of upper margin and insole to be bonded. The wiper 60 is reciprocated at such a rapid rate that it engages substantially all of the course of the upper margin and forces it against the rib and feather with a hammering action. The yieldable drive for the wiper provided by the spring 64 enables the wiper to yield if it encounters a thickened portion of the upper margin such as a seam. Under some circumstances it has been found advantageous to disconnect the drive for the bar 50 so that the wiper is yieldably urged outwardly by the spring 64 during the operation of the machine but otherwise is stationary in the position shown in FIGURES 9 and 10.

After the end of the course of the upper and insole is reached, the motors 26, 74, 106 and 150 are actuated to return the parts controlled by them to their idle condition and the rotary movement of the rolls 20, 24 and the reciprocatory movement of the wiper 60 are terminated.

The cement pot 110 is so dimensioned that the plunger 106 does not bottom against the bottom of the bore 132 during the passage of a single course of the upper margin through the rolls 20, 24.

While the rolls 20 and 24 are shown in FIGURE 3 as inclined to the vertical by about 5 degrees, they can perform the above described functions when mounted to rotate about a vertical axis.

It should be understood that the present disclosure is for the purpose of illustration only and that the invention includes all modifications and equivalents which fall within the scope of the appended claims.

We claim:

1. A lasting machine for adhesively bonding a course of a shoe upper margin to a course of a shoe insole, wherein the insole is mounted on the bottom of a last supported bottom-up and has a welt rib extending away from the last bottom that is spaced from the insole edge by a feather and wherein the upper is mounted on the last with the upper margin extending upwardly of the insole and welt rib with a zone of the upper margin at a higher elevation than the welt rib, comprising: gripping means operative to grip the upper margin at a selected portion of said zone and concomitantly advance the margin forwardly and pull the margin heightwise to stretch the upper tightly about the last; hold-down means operative to restrain upward movement of the last and insole; a nozzle located to the rear of the gripping means having an orifice therein located at a lower elevation than the gripping means, a bottom portion adapted to bear against the insole feather and a front portion facing the gripping means that rises upwardly of the bottom portion and intersects the orifice; means for extruding cement through the nozzle orifice to apply the cement in the angle between the insole feather and the welt rib; and pressing means positioned below the gripping means operative to press the up-pulled margin located below the gripping means against the welt rib and feather to thereby adhesively bond the upper margin to the rib and feather.

2. A lasting machine for adhesively bonding a course of a shoe upper margin to a course of a shoe insole, wherein the insole is mounted on the bottom of a last supported bottom-up and has a welt rib extending away from the last bottom that is spaced from the insole edge by a feather and wherein the upper is mounted on the last with the upper margin extending upwardly of the insole and welt rib with a zone of the upper margin at a higher elevation than the welt rib, comprising: gripping means operative to grip the upper margin at a selected portion of said zone and concomitantly advance the margin forwardly and pull the margin heightwise to stretch the upper tightly about the last; hold-down means operative to restrain upward movement of the last and insole; a nozzle located to the rear of the gripping means having an orifice located at a lower elevation than the gripping means; means for extruding cement through the nozzle orifice to apply the cement in the angle between the insole feather and the welt rib; means for yieldably urging the nozzle downwardly against the feather; and pressing means positioned below the gripping means operative to press the up-pulled margin located below the gripping means against the welt rib and feather to thereby adhesively bond the upper margin to the rib and feather.

3. A lasting machine for adhesively bonding a course of a shoe upper margin to a course of a shoe insole, wherein the insole is mounted on the bottom of a last supported bottom-up and has a welt rib extending away from the last bottom that is spaced from the insole edge by a feather and wherein the upper is mounted on the last with the upper margin extending upwardly of the insole and welt rib with a zone of the upper margin at a higher elevation than the welt rib, comprising: gripping means operative to grip the upper margin at a selected portion of said zone and concomitantly advance the margin forwardly and pull the margin heightwise to stretch the upper tightly about the last; hold-down means operative to restrain upward movement of the last and insole; a base, a cement pot mounted on the base for swinging movement about a prone axis; a nozzle on the cement pot, located to the rear of the gripping means, having an orifice located at a lower elevation than the gripping means; means for extruding cement from the cement pot through the nozzle orifice to apply the cement in the angle between the insole feather and the welt rib; means for yieldably urging the cement pot about said axis in a direction to urge the nozzle downwardly against the feather; and pressing means positioned below the gripping means operative to press the up-pulled margin located below the gripping means against the welt rib and feather to thereby adhesively bond the upper margin to the rib and feather.

4. A lasting machine for adhesively bonding a course of a shoe upper margin to a course of a shoe insole, wherein the insole is mounted on the bottom of a last supported bottom-up and has a welt rib extending away from the last bottom that is spaced from the insole edge by a feather and wherein the upper is mounted on the last with the upper margin extending upwardly of the insole and welt rib with a zone of the upper margin at a higher elevation than the welt rib, comprising: gripping means operative to grip the upper margin at a selected portion of said zone and concomitantly advance the margin forwardly and pull the margin heightwise to stretch the upper tightly about the last; hold-down means operative to restrain upward movement of the last and insole; a nozzle located to the rear of the gripping means having an orifice located at a lower elevation than the gripping means; means for extruding cement through the nozzle orifice to apply the cement in the angle between the insole feather and the welt rib; means for yieldably urging the nozzle downwardly against the feather and laterally against the welt rib; and pressing means positioned below the gripping means operative to press the up-pulled margin located below the gripping means against the welt rib and feather to thereby adhesively bond the upper margin to the rib and feather.

5. A lasting machine for adhesively bonding a course of a shoe upper margin to a course of a shoe insole, wherein the insole is mounted on the bottom of a last supported bottom-up and has a welt rib extending away from the last bottom that is spaced from the insole edge by a feather and wherein the upper is mounted on the last with the upper margin extending upwardly of the insole and welt rib with a zone of the upper margin at a higher elevation than the welt rib, comprising: gripping means operative to grip the upper margin at a selected portion of said zone and concomitantly advance the margin forwardly and pull the margin heightwise to stretch the upper tightly about the last; holddown means operative to restrain upward movement of the last and insole; a base; a bracket mounted on the base for swinging movement about an upright axis; a cement pot mounted on the bracket for swinging movement about a prone axis; a nozzle on the cement pot, located to the rear of the gripping means, having an orifice located at a lower elevation than the gripping means; means for extruding cement from the cement pot through the nozzle orifice to apply the cement in the angle between the insole feather and the welt rib; means for yieldably urging the cement pot about said axes in directions to urge the nozzle downwardly against the feather and laterally against the welt rib; and pressing means positioned below the gripping means operative to press the up-pulled margin located below the gripping means against the welt rib and feather to thereby adhesively bond the upper margin to the rib and feather.

6. A lasting machine for adhesively bonding a course of shoe upper margin to a course of a shoe insole, wherein the insole is mounted on the bottom of a last supported bottom-up and has a welt rib extending away from the last bottom that is spaced from the insole edge by a feather and wherein the upper is mounted on the last with the upper margin extending upwardly of the insole and welt rib with a zone of the upper margin at a higher elevation than the welt rib, comprising: a first, upwardly and outwardly tapering, frustro-conical feed roll adapted to engage the exterior upper margin surface at said zone; a second, downwardly and outwardly tapering, frustro-conical feed roll adapted to engage the interior margin surface at said zone; means to rotate the feed rolls to concomitantly advance the margin forwardly and pull the margin heightwise to stretch the upper tightly about the last; cement applying means located to the rear of the feed rolls and at a lower elevation than the feed rolls for applying cement in the angle between the insole feather and the welt rib; a button depending from the second roll adapted to bear against the insole surface and against the interior surface of the welt rib; a wiper positioned below the first feed roll at the same elevation as said button and opposite the button adapted to press the up-pulled margin located below the feed rolls against the welt rib and feather to thereby adhesively bond the upper margin to the feather and rib; and means for yieldably urging the wiper toward the button.

7. A method of bonding a course of a shoe upper margin to a course of a shoe insole comprising the steps of: providing a last having an insole mounted on its bottom and an uper mounted thereon, said insole having a welt rib extending away from the last bottom that is spaced from the insole edge by a feather; supporting the last bottom-up so that the upper margin extends upwardly of the insole and the welt rib with a zone of the upper margin at a higher elevation than the welt rib; applying gripping means to the beginning of the course of the upper margin in said zone; applying a hold-down force to restrain upward movement of the last and concomitantly causing the gripping means to advance the margin forwardly and pull the margin heightwise to stretch the upper tightly about the last; applying cement in the angle between the insole feather and the welt rib at a location to the rear of the gripping means; applying a yieldable downwardly directed force to the insole feather proximate to the location of cement application; applying a pressing force below the gripping means to press the up-pulled upper margin located below the gripping means against the welt rib and the feather to thereby adhesively bond the upper margin to the rib and feather; and continuously operating the gripping means, applying the cement, and applying the hold-down force, the yieldable force and the pressing force from one end of the course of the upper and insole to the other.

8. A method of bonding a course of a shoe upper margin to a course of a shoe insole comprising the steps of: providing a last having an insole mounted on its bottom and an upper mounted thereon, said insole having a welt rib extending away from the last bottom that is spaced from the insole edge by a feather, supporting the last bottom-up so that the upper margin extends upwardly of the insole and the welt rib with a zone of the upper margin at a higher elevation than the welt rib; applying gripping means to the beginning of the course of the upper margin in said zone; applying a hold-down force to restrain upward movement of the last and concomitantly causing the gripping means to advance the margin forwardly and pull the margin heightwise to stretch the upper tightly about the last; applying cement in the angle between the insole feather and the welt rib at a location to the rear of the gripping means; applying a yieldable force that is directed downwardly against the insole feather and laterally against the welt rib in a location that is proximate to the location of cement application; applying a pressing force below the gripping means to press the up-pulled upper margin located below the gripping means against the welt rib and the feather to thereby adhesively bond the upper margin to the rib and feather; and continuously operating the gripping means, applying the cement, and applying the hold-down force, the yieldable force and the pressing force from one end of the course of the upper and insole to the other.

9. A method of bonding a course of a shoe upper margin to a course of a shoe insole comprising the steps of: providing a last having an insole mounted on its bottom and an upper mounted thereon, said insole having a welt rib extending away from the last bottom that is spaced from the insole edge by a feather; supporting the last bottom-up so that the upper margin extends upwardly of the insole and the welt rib with a zone of the upper margin at a higher elevation than the welt rib; applying gripping means to the beginning of the course of the upper margin in said zone; applying a hold-down force to restrain upward movement of the last and concomitantly causing the gripping means to advance the margin forwardly and pull the margin heightwise to stretch the upper tightly about the last; providing a nozzle having an orifice therein; yieldably urging the nozzle downwardly against the feather in a location that is rearward of the gripping means; extruding cement through the nozzle to apply the cement in the angle between the insole feather and the welt rib; applying a pressing force below the gripping means to press the up-pulled upper margin located below the gripping means against the welt rib and the feather to thereby adhesively bond the upper margin to the rib and feather; and continuously operating the gripping means, extruding the cement, urging the nozzle against the feather and applying the hold-down force and the pressing force from one end of the course of the upper and insole to the other.

10. A method of bonding a course of a shoe upper margin to a course of a shoe insole comprising the steps of: providing a last having an insole mounted on its bottom and an upper mounted thereon, said insole having a welt rib extending away from the last bottom that is spaced from the insole edge by a feather; supporting the last bottom-up so that the upper margin extends upwardly of the insole and the welt rib with a zone of the upper margin at a higher elevation than the welt rib; applying gripping means to the beginning of the course of the upper margin in said zone; applying a hold-down force to restrain upward movement of the last and concomitantly causing the gripping means to advance the margin forwardly and pull the margin heightwise to stretch the upper tightly about the last; providing a nozzle having an orifice therein; yieldably urging the nozzle downwardly against the feather and laterally against the welt rib in a location that is rearward of the gripping means; extruding cement through the nozzle to apply the cement in the angle between the insole feather and the welt rib; applying a pressing force below the gripping means to press the up-pulled upper margin located below the gripping means against the welt rib and the feather to thereby adhesively bond the upper margin to the rib and feather; and continuously operating the gripping means, extruding the cement, urging the nozzle against the feather and welt rib and applying the hold-down force and the pressing force from one end of the course of the upper and insole to the other.

11. A method of bonding a course of a shoe upper margin to a course of a shoe insole comprising the steps of: providing a last having an insole mounted on its bottom and an upper mounted thereon, said insole having a welt rib extending away from the last bottom that is spaced from the insole edge by a feather; supporting the last bottom-up so that the upper margin extends upwardly of the insole and the welt rib with a zone of the upper margin at a higher elevation than the welt rib; gripping the beginning of the course of the upper in said zone between a first upwardly and outwardly tapering frustro-conical feed roll that engages the exterior upper margin surface and a second downwardly and outwardly tapering frustro-conical feed roll that engages the interior margin surface with the bottom of the second feed roll bearing against the uppermost surface of the welt rib; rotating the feed rolls to cause them concomitantly to advance the margin forwardly and pull the margin heightwise to stretch the upper tightly about the last; applying cement in the angle between the insole feather and the welt rib at a location to the rear of the gripping means; providing a first bearing surface below the second feed roll that bears downwardly against the insole and a second bearing surface below the second feed roll that bears outwardly against the interior surface of the insole rib; providing a wiper that is positioned below the first feed roll at the same elevation as said second bearing surface and opposite said second bearing surface; yieldably urging the wiper toward the second bearing surface to press the up-pulled margin located below the feed rolls against the welt rib and feather to thereby adhesively bond the upper margin to the feather and rib; and continuously rotating the feed rolls, applying the cement, applying the bearing forces and applying the pressing force from one end of the course of the upper and insole to the other.

References Cited by the Examiner
UNITED STATES PATENTS

| | | | |
|---|---|---|---|
| 2,000,912 | 5/35 | Bates | 12—7.9 |
| 2,254,224 | 9/41 | Kamborian | 12—145 |
| 2,659,912 | 11/53 | Kamborian | 12—145 |
| 2,667,908 | 2/54 | Kamborian | 12—8.3 X |
| 2,708,278 | 5/55 | Kamborian | 12—8.3 |
| 2,709,268 | 5/55 | Kamborian | 12—8.3 |
| 2,969,555 | 1/61 | Kamborian | 12—145 |
| 2,970,330 | 2/61 | Kamborian | 12—8.3 |
| 2,978,717 | 4/61 | Kamborian | 12—8.3 |
| 3,009,182 | 11/61 | Kamborian | 12—145 |

JORDAN FRANKLIN, *Primary Examiner.*

EDWARD V. BENHAM, *Examiner.*